US012412450B2

(12) United States Patent
Huke et al.

(10) Patent No.: US 12,412,450 B2
(45) Date of Patent: *Sep. 9, 2025

(54) METHOD OF TRACKING USER BETS TO ENSURE COMPLIANCE

(71) Applicant: AdrenalineIP, Washington, DC (US)

(72) Inventors: Casey Alexander Huke, Washington, DC (US); Joseph W. Beyers, Saratoga, CA (US); Michael D'Andrea, Burlington, VT (US); Jeff Goodwin, Montpelier, VT (US)

(73) Assignee: AdrenalineIP, Washington, DC (US)

( * ) Notice: Subject to any disclaimer, the term of this patent is extended or adjusted under 35 U.S.C. 154(b) by 272 days.

This patent is subject to a terminal disclaimer.

(21) Appl. No.: 18/187,897

(22) Filed: Mar. 22, 2023

(65) Prior Publication Data

US 2023/0222871 A1 Jul. 13, 2023

Related U.S. Application Data

(63) Continuation of application No. PCT/US2021/050799, filed on Sep. 17, 2021, which is a continuation of application No. 17/070,153, filed on Oct. 14, 2020, now Pat. No. 11,282,333.

(60) Provisional application No. 63/081,577, filed on Sep. 22, 2020.

(51) Int. Cl.
*G07F 17/32* (2006.01)

(52) U.S. Cl.
CPC ...... *G07F 17/3239* (2013.01); *G07F 17/3241* (2013.01); *G07F 17/3288* (2013.01)

(58) Field of Classification Search
CPC ............ G07F 17/3239; G07F 17/3241; G07F 17/3288
See application file for complete search history.

(56) References Cited

U.S. PATENT DOCUMENTS

| | | | |
|---|---|---|---|
| 6,416,409 | B1 | 7/2002 | Jordan |
| 8,092,292 | B1 | 1/2012 | White |
| 2002/0002075 | A1 | 1/2002 | Rowe |
| 2002/0138461 | A1 | 9/2002 | Sinclair et al. |
| 2003/0022719 | A1 | 1/2003 | Donald et al. |
| 2005/0043086 | A1 | 2/2005 | Schneider et al. |
| 2006/0211493 | A1 | 9/2006 | Walker et al. |
| 2006/0281537 | A1 | 12/2006 | Abbott |
| 2007/0238502 | A1 | 10/2007 | Pokorny et al. |
| 2009/0318220 | A1 | 12/2009 | Arezina et al. |
| 2010/0279765 | A9 | 11/2010 | Walker et al. |
| 2019/0026983 | A1 | 1/2019 | Arnone et al. |
| 2019/0180558 | A1 | 6/2019 | Merati |

OTHER PUBLICATIONS

International Search Report and Written Opinion issued on Dec. 27, 2021 in corresponding International Patent Application No. PCT/US2021/050799; 16 pages.

*Primary Examiner* — Kevin Y Kim
(74) *Attorney, Agent, or Firm* — Maier & Maier, PLLC

(57) ABSTRACT

A method of monitoring user behavior to adjust betting odds based upon that behavior or to identify users who may be cheating, where users are subscribers of a proprietary data management and analytic software system/wagering platform. The system monitors users' behavior for deviations from their normal betting habits or patterns to detect cheating and lower the threshold for winning when user patterns change.

17 Claims, 4 Drawing Sheets

Content - High Level Diagram

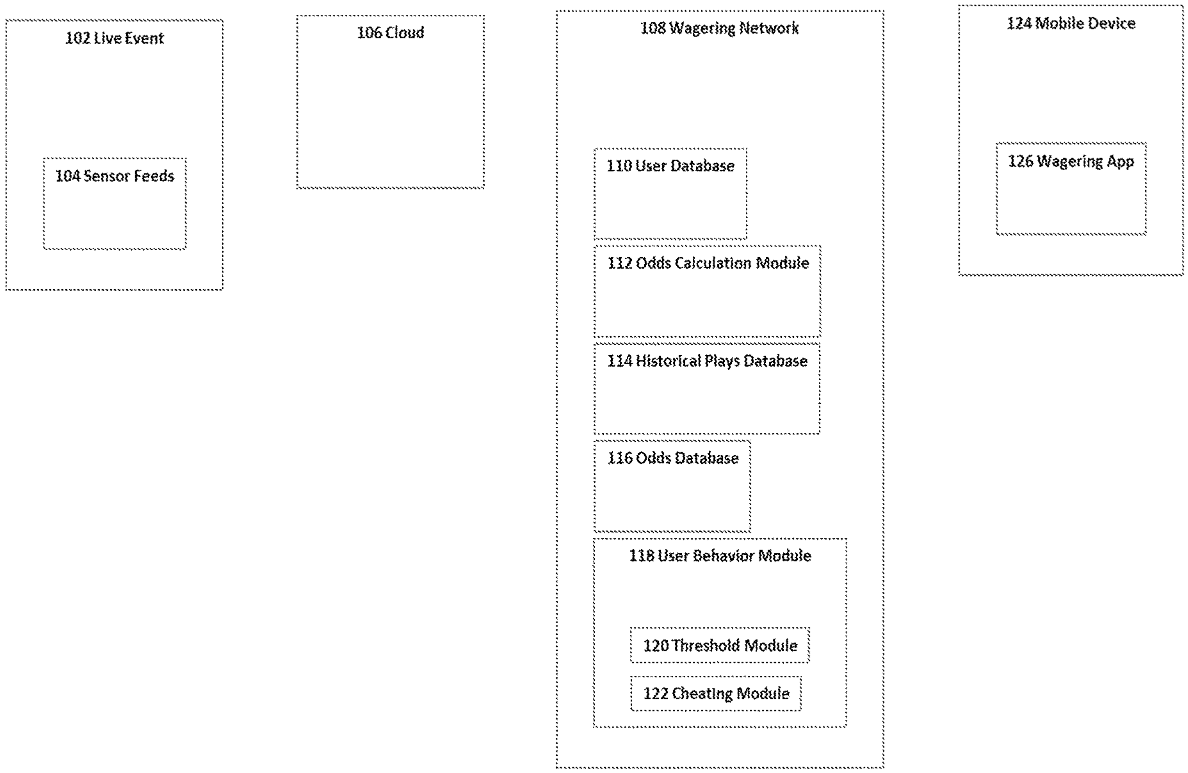
Fig.1 Content - High Level Diagram
| User ID | Device ID | Wager History | Wallet Balance |
|---|---|---|---|
| Joe Smith | 1234 | JSWH.dat | $500 |
| Robert Jones | 2345 | RJWH.dat | $1,250 |
| Susan Rice | 3456 | SRWH.dat | $10 |
| | ... | | |
| Mike Baker | 8791 | MBWH.dat | $200 |
Fig.2 User Database Data Content

| Live Event | Event | Odds | Winning Threshold |
|---|---|---|---|
| Baseball | Single | 4:1 | 20 |
| Baseball | Walk | 5:1 | 15 |
| Baseball | Homerun | 30:1 | 4 |
| Football | First down | 10:1 | 10 |
| Football | Sack | 23:1 | 7 |
Fig.3 Odds Database Data Content
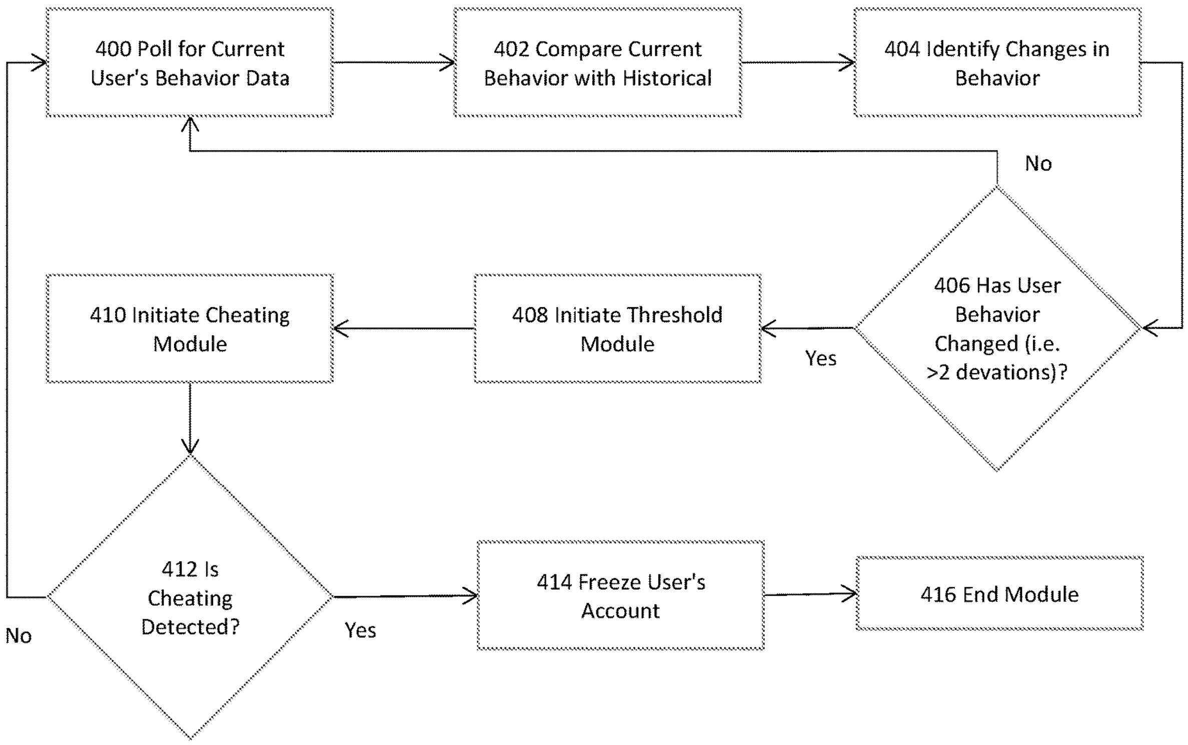
Fig.4 User Behavior Module Object Content

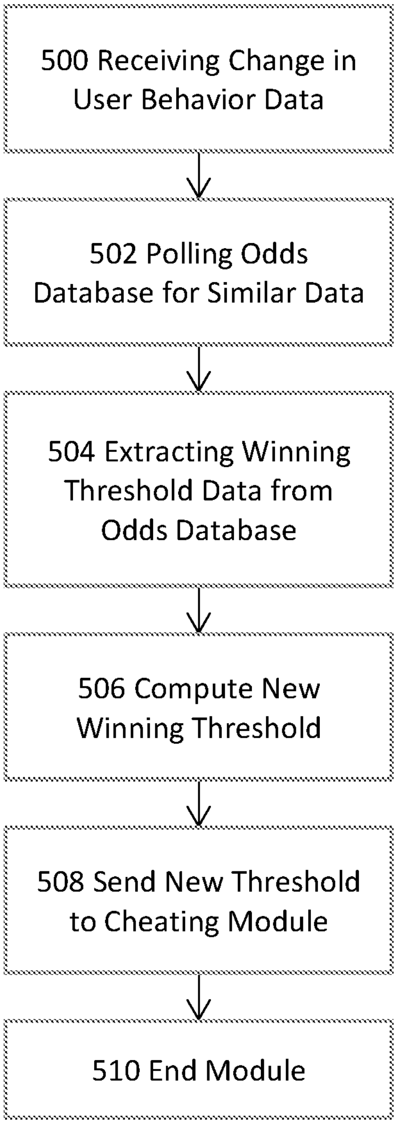
Fig.5 Threshold Module Object Content

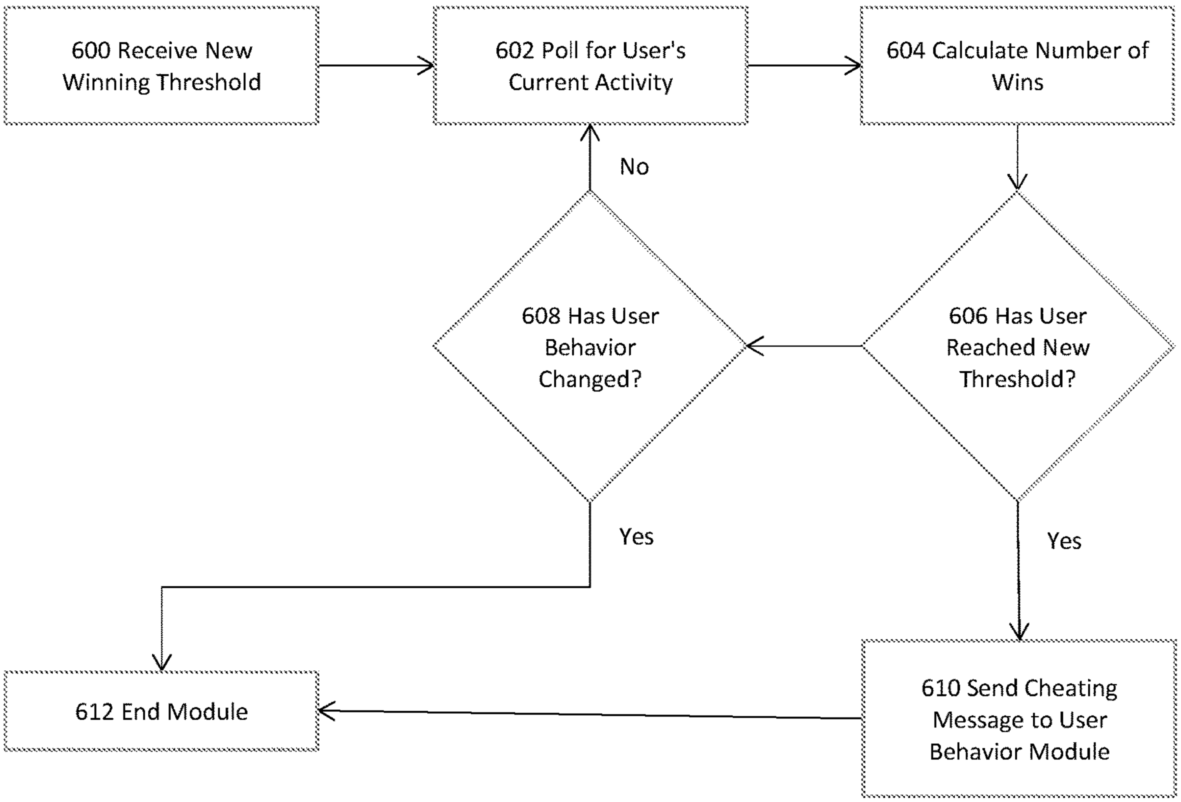
Fig.6 Cheating Module Object Content

METHOD OF TRACKING USER BETS TO ENSURE COMPLIANCE

CROSS-REFERENCE TO RELATED APPLICATIONS

This application is a continuation of International Application No. PCT/US2021/050799, filed on Sep. 17, 2021, which claims the benefit and priority to U.S. application Ser. No. 17/070,153, filed on Oct. 14, 2020, now U.S. Pat. No. 11,282,333, which claims benefit and priority to U.S. Provisional Patent Application No. 63/081,577, filed Sep. 22, 2022. The entire contents of each of the above-identified applications are incorporated herein reference.

FIELD

The embodiments are generally related to a method of tracking user bets to ensure compliance or detect cheating by monitoring a user's betting habits.

BACKGROUND

With the U.S. Supreme Court invalidating the 1992 Professional and Amateur Sports Protection Act, legalizing sports gambling, there will be a proliferations of online platforms that allow users to wager on sports through their mobile devices.

As mobile apps make wagering on sports easier and in-play betting makes wagering faster platforms and users need tools to ensure responsible gaming, such as wager amount or frequency limitations.

Wagering platforms need tools to ensure wagers or users are compliant with the rules of betting to prevent cheating.

Background

It is therefore desirable to have alternative methods to identifying those users that are not compliant or are cheating or attempting to cheat. Relying on one variable such as just a winning threshold may not be enough to prevent a user from cheating a system. If a user determines what the threshold is for a particular event or odds, they could cheat the system by only winning up until they are close to the threshold. The user would then change to a different event or stop betting until their winnings count is reset.

One embodiment includes a method of tracking user wagers to ensure compliance, including: storing historical wager history and/or wager patterns of a user in a user database; calculating a change in the wager patterns of a user by comparing current wager activity of the user with the historical wager activity in the user database; identifying a change in wager activity of the user; and calculating a new winnings threshold for new wager patterns identified of the user.

Another exemplary embodiment can include a system for tracking user wagers to prevent cheating, including: a user behavior module that polls, tracks, and compares user wagering using historic user wager activity and current user wager activity in a live event; a comparison between the user historical wager data and the current user wager data in a live event; a threshold module that determines if the current user wager activity is outside of a predetermined deviation from the user historical wager data; and and a cheating module that prevents the user from making wagers if the determination is outside of the predetermined deviation.

BRIEF DESCRIPTIONS OF THE DRAWINGS

The accompanying drawings illustrate various embodiments of systems, methods, and various other aspects of the embodiments. Any person with ordinary skills in the art will appreciate that the illustrated element boundaries (e.g. boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1 illustrates a tracking user bets to ensure compliance, according to an embodiment.

FIG. 2 illustrates a user database, according to an embodiment.

FIG. 3 illustrates an odds database, according to an embodiment.

FIG. 4 illustrates a user behavior module, according to an embodiment.

FIG. 5 illustrates a threshold module, according to an embodiment.

FIG. 6 illustrates a cheating module, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "wager" or "bet." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The “total” is the combined number of runs, points or goals scored by both teams during the game, including overtime. The “over” refers to a sports bet in which the player wagers that the combined point total of two teams will be more than a specified total. The “under” refers to bets that the total points scored by two teams will be less than a certain figure. “Total”, “over”, and “under” can be integrated into the embodiments in a variety of manners.

A “parlay” is a single bet that links together two or more wagers; to win the bet, the player must win all the wagers in the “parlay”. If the player loses one wager, the player loses the entire bet. However, if he wins all the wagers in the “parlay”, the player wins a higher payoff than if the player had placed the bets separately. A “round robin” is a series of parlays. A “teaser” is a type of parlay in which the point spread, or total of each individual play is adjusted. The price of moving the point spread (teasing) is lower payoff odds on winning wagers. “Parlay”, “round robin”, “teaser” can be integrated into the embodiments in a variety of manners.

A “prop bet” or “proposition bet” means a bet that focuses on the outcome of events within a given game. Props are often offered on marquee games of great interest. These include Sunday and Monday night pro football games, various high-profile college football games, major college bowl games and playoff and championship games. An example of a prop bet is “Which team will score the first touchdown?” “Prop bet” or “proposition bet” can be integrated into the embodiments in a variety of manners.

A “first-half bet” refers to a bet placed on the score in the first half of the event only and only considers the first half of the game or event. The process in which you go about placing this bet is the same process that you would use to place a full game bet, but as previously mentioned, only the first half is important to a first-half bet type of wager. A “half-time bet” refers to a bet placed on scoring in the second half of a game or event only. “First-half-bet” and “half-time-bet” can be integrated into the embodiments in a variety of manners.

A “futures bet” or “future” refers to the odds that are posted well in advance on the winner of major events, typical future bets are the Pro Football Championship, Collegiate Football Championship, the Pro Basketball Championship, the Collegiate Basketball Championship, and the Pro Baseball Championship. “Futures bet” or “future” can be integrated into the embodiments in a variety of manners.

The “listed pitchers” is specific to a baseball bet placed only if both of the pitchers scheduled to start a game actually start. If they don’t, the bet is deemed “no action” and refunded. The “run line” in baseball, refers to a spread used instead of the money line. “Listed pitchers” and “no action” and “run line” can be integrated into the embodiments in a variety of manners.

The term “handle” refers to the total amount of bets taken. The term “hold” refers to the percentage the house wins. The term “juice” refers to the bookmaker’s commission, most commonly the 11 to 10 bettors lay on straight point spread wagers: also known as “vigorish” or “vig”. The “limit” refers to the maximum amount accepted by the house before the odds and/or point spread are changed. “Off the board” refers to a game in which no bets are being accepted. “Handle”, “juice”, vigorish”, “vig” and “off the board” can be integrated into the embodiments in a variety of manners.

“Casinos” are a public room or building where gambling games are played. “Racino” is a building complex or grounds having a racetrack and gambling facilities for playing slot machines, blackjack, roulette, etc. “Casino” and “Racino” can be integrated into the embodiments in a variety of manners.

Customers are companies, organizations or individual that would deploy, for fees, and may be part of, of perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

“Cash out” or “pay out” or “payout” allow customers to make available, on singles bets or accumulated bets with a partial cash out where each operator can control payouts by managing commission and availability at all times. The “cash out” or “pay out” or “payout” can be integrated into the embodiments in a variety of manners, including both monetary and non-monetary payouts, such as points, prizes, promotional or discount codes, and the like.

“Customized betting” allow customers to have tailored personalized betting experiences with sophisticated tracking and analysis of players’ behavior. “Customized betting” can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers to manage the sports gaming. Business Applications can be integrated into the embodiments in a variety of manners.

State based integration allows for a given sports gambling game to be modified by states in the United States or countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

“Fantasy sports connector” are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a “fumble” could be recognized and at the time stamp of the event, metadata such as “fumble” could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user’s view of the real world, thus providing a composite view. In an example of this invention, a real time view of the game can be seen and a “bet” which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms “a,” “an,” and “the” include plural references unless the context clearly dictates otherwise. Although any systems and methods similar or equivalent to those described herein can be used in the practice or testing of embodiments, only some exemplary systems and methods are now described.

FIG. 1 is a system for tracking user bets to ensure compliance. The system may include a live event 102, for example a sporting event such as a football game, basketball game, baseball game, hockey game, tennis match, golf tournament, eSports or digital game, etc. The live event 102 will include some number of actions or plays, upon with a user or bettor or customer can place a bet or wager, typically through an entity called a sportsbook. There are numerous types of wagers the bettor can make, including, a straight bet, a money line bet, a bet with a point spread or line that bettor’s team would need to cover, if the result of the game with the same as the point spread the user would not cover the spread, but instead the tie is called a push. If the user is betting on the favorite, they are giving points to the opposing side, which is the underdog or longshot. Betting on all favorites is referred to as chalk, this is typically applied to round robin, or other styles of tournaments. There are other types of wagers, including parlays, teasers, and prop bets, that are added games, that often allow the user to customize their betting, by changing the odds and payouts they receive on a wager. Certain sportsbooks will allow the bettor to buy points, to move the point spread off of the opening line, this will increase the price of the bet, sometimes by increasing the juice, vig, or hold that the sportsbook takes. Another type of wager the bettor can make is an over/under, in which the user bets over or under a total for the live event 102, such as the score of American football or the run line in baseball, or a series of action in the live event 102. Sportsbooks have a number of bets they can handle, a limit of wagers they can take on either side of a bet before they will move the line or odds off of the opening line. Additionally, there are circumstance, such as an injury to an important player such as a listed pitcher, in which a sportsbook, casino or racino will take an available wager off the board. As the line moves there becomes an opportunity for a bettor to bet on both sides at different point spreads in order to middle and win both bets. Sportsbooks will often offer bets on portions of games, such as first half bets and half-time bets. Additionally, the sportsbook can offer futures bets on live events 102 in the future. Sportsbooks need to offer payment processing services in order to cash out customers. This can be done at kiosks at the live event 102 or at another location.

Further, embodiments may include a plurality of sensors 104 that may be used such as motion sensors, temperature sensors, humidity sensors, cameras such as an RGB-D Camera which is a digital camera capable of capturing color (RGB) and depth information for every pixel in an image, microphones, radiofrequency receiver, a thermal imager, a radar device, a lidar device, an ultrasound device, a speaker, wearable devices etc. Also, the plurality of sensors 104 may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that captures statistical information through real-time X, Y positioning of players and X, Y, Z positioning of the ball. In this system only the video feed is used, but in other embodiments additional sensor data can be used to augment the accuracy of the probabilistic engine.

Further, embodiments may include a cloud 106 or communication network that may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, often over the Internet and relies on sharing of resources to achieve coherence and economies of scale, like a public utility, while third-party clouds enable organizations to focus on their core businesses instead of expending resources on computer infrastructure and maintenance. The cloud may be communicatively coupled to wagering network 108 which may perform real time analysis on the type of play and the result of the play. The cloud 106 may also be synchronized with game situational data, such as the time of the game, the score, location on the field, weather conditions, and the like which may affect the choice of play utilized. For example, in other exemplary embodiments, the cloud may not receive data gathered from sensors and may, instead, receive data from an alternative data feed, such as SportsRadar®. This data may be compiled substantially immediately following the completion of any play and the data from this feed may be compared with a variety of team data and league data based on a variety of elements, including down, possession, score, time, team, and so forth, as described in various exemplary embodiments herein.

Further, embodiments may include a wagering network 108 which may perform real time analysis on the type of play and the result of a play or action. The wagering network may also be synchronized with game situational data, such as the time of the game, the score, location on the field, weather conditions, and the like which may affect the choice of play utilized. For example, in other exemplary embodiments, wagering network 108 may not receive data gathered from sensors and may, instead, receive data from an alternative data feed, such as Sports Radar. This data may be compiled substantially immediately following the completion of any play and the data from this feed may be compared with a variety of team data and league data based on a variety of elements, including down, possession, score, time, team, and so forth, as described in various exemplary embodiments herein. The wagering network can offer a number of software as a service managed services such as, user interface service, risk management service, compliance, pricing and trading service, IT support of the technology platform, business applications, game configuration, state based integration, fantasy sports connection, integration to allow the joining of social media, as well as marketing support services that can deliver engaging promotions to the user.

Further, embodiments may include a user database 110 which contains data relevant to all users of the system, including but not limited to, a user ID of the user, a device identifier, a paired device identifier, wagering history, and wallet information for the user. For example, a user's wager history may include a file that has the types of live event 102 and events within the live event 102 that the user wages on including the amount they waged, the odds for the wager, and the amount they won or lost.

Further, embodiments may include an odds calculation module 112 which utilizes historical play data, as well as the 3rd party network's 122 analytics, to calculate odds for in-play wagers.

Further, embodiments may include a historical plays database 114, that contains play data for the type of sport being played in live event 102. Further, embodiments may include a historical plays database 114, that contains play data for the type of sport being played in live event 102. In one embodiment, for optimal odds calculation, the historical play data should include metadata about the historical plays, such as time of the live event 102, location, weather, previous plays, opponent, physiological data of the players (including blood pressure, pulse rate, and respiration rate), batting average of all players, information related to the players such as injuries in the past, batting average, earned run average, catch probability, spin rate, launch angle, exit velocity, information related to trainers of each player, etc. For example, in the baseball game, information stored in the historical plays database 114 may include information related to the previous baseball games played by a specific team or player, such as, but not limiting to, the weather condition, i.e. during the match, it was cloudy.

Further, embodiments may include an odds database 116 that contains the odds calculated by the odds calculation module and is used to display the odds on the mobile device 124, and to take bets from the user through the mobile device wagering app 126. Furthermore, the odds database 116 contains data for winning thresholds for cutting users betting off if they start winning too much. Winning thresholds can be determined based on odds of winning. For example, an event where the user is more likely to win would have a higher threshold as it would be expected for a user to win more often.

Further, embodiments may include a user behavior module 118 that analyzes a user's behavior by comparing the user's current betting habits or patterns with historical user data from the user database 110. If a change is detected in the user's betting behavior or pattern, the threshold module 120 and cheating module 122 are initiated. There are several methods that can be used to determine the change in a user's behavior, for example, users betting habits such as how often, time of day, type of sporting events, type of event, wager amounts, and winning or losses. These data points are then plotted, and a normal distribution or trends can be calculated. Deviation from the normal distribution or trend can then be determined based on a user's current behavior. Other methods are also well known in user behavior monitoring such as pattern matching. For example, a user may have the habit of wagering on a baseball game and events in that game. The user may only bet on if a batter will get a single or walk and usually wagers between $3 and $5 per wager. A change in the user's behavior may be detected if the user starts only wagering on batters striking out and batters getting home runs while also increasing his wager amount. It would be obvious that the user has deviated from his typical behavior. Now if a user only changes is wager on occasion the calculated and plotted deviation would not be enough to trigger a user's change in behavior.

Further, embodiments may include a threshold module 120 determines a user's new winning threshold when a user's betting behavior or pattern changes. The threshold module 120 looks at the current user's behavior, compares it to the similar behavior in the odds database 116, extracts the normal winning threshold for the behavior and then discounts the threshold based on the odds. For example, if a user's pattern of betting changes to a new betting event with higher odds compared to the user's normal habits, they the threshold for winning maybe reduced by 50%. For example, if a typical winning threshold for wagering on if a batter in a baseball game will strike out is say 10 within a game. The threshold module 120 would reduce this by 50% to 5 wager wins during the baseball game while wagering on strikeouts.

Further, embodiments may include a cheating module 122, that monitors a user's winnings and compares the user's wins to the updated threshold determined by the threshold module 120. If a user exceeds the updated threshold the user's betting is halted. For example, if a user's changes their behavior from wagering on a batter in a baseball games getting a single to striking out and they end up winning 5 wagers. The system would freeze or halt the user's account preventing them from any further bets.

Further, embodiments may include a mobile device 124 such as a computing device, laptop, smartphone, tablet, computer, smart speaker, or I/O devices. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple IPHONE. Some devices allow gesture recognition inputs through combining some of the inputs and outputs. Some devices allow for facial recognition which may be utilized as an input for different purposes including authentication and other commands. Some devices allow for voice recognition and inputs, including, e.g., Microsoft KINECT, SIRI for IPHONE by Apple, Google Now or Google Voice Search. Additional user devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, e.g., a mouse or optical pen. Furthermore, an I/O device may also allow storage and/or an installation medium for the computing device. In still other embodiments, the computing device may allow USB connections (not shown) to receive handheld USB storage devices. In further embodiments, an I/O device may be a bridge between the system bus and an external communication bus, e.g. a USB bus, a SCSI bus, a FireWire bus, an Ethernet bus, a Gigabit Ethernet bus, a Fiber Channel bus, or a Thunderbolt bus. In the embodiments the user device could be an optional component and would be utilized in a situation in which the paired wearable device is utilizing the user device as additional memory or computing power or connection to the internet.

Further, embodiments may include a wagering app 126, which is a program that enables the user to place bets on individual plays in the live event 102, and display the audio and video from the live event 102, along with the available wagers, and statistical and analytical overlays on either the user's mobile device 124. The wagering app 126 allows the user to interact with the wagering network in order to place bets and allow payment/receive funds based on wager outcomes.

FIG. 2 illustrates the user database 110. The database contains information about all of the users of the wagering network 108. This information includes, but is not limited to, a user identification, which is the user's name in this example but could also be any other kind of alphanumeric identification or other form identification. A device identification, for the mobile device 124 on which the wagering app 126 is installed. The user's wager history, which is a data file in this example, can be accessed or stored in association with wagering app 126. The user's current wallet/account balance may also be provided, in this example the balance is in US dollars, but the system could use other currencies or non-monetary prizes such as points.

FIG. 3 illustrates the user database 116. The odds database 116 contains the odds calculated by the odds calculation module, and is used to display the odds on the mobile device 124, and to take bets from the user through the mobile device wagering app 126. Furthermore, the odds database 116 contains data for winning thresholds for cutting users betting of if they start winning too much. Winning thresholds can be determined based on odds of winning. For example, an event where the user is more likely to win would have a higher threshold as it would be expected for a user to win more often.

FIG. 4 illustrates the user behavior module 118. The user behavior module 118 begins with the polling, at step 400, for current user behavior data. The current user behavior data can be polled directly from the user's device, in this case the mobile device 124 or by looking at current user data in the user database 110. Current behavior data can be defined different ways depending on how the system is configured. For example, current behavior could be any behavior in the last 24 hours or could just be related to the current live event 102. For example, the current user data may include current event, what they are wagering on, the odds, and amount. Current user behavior data may only be relevant to a single live event 102 which the user is currently wagering on. Once the current user's behavior data is received, it is compared, at step 402 to the user's historical behavior data. There are several ways of comparing user behaviors, for example, the current and historical user behavior data are plotted, and trends or normal distributions are calculated. These plots are then compared for changes in behavior. Furthermore, a user may have the habit or pattern of only wagering on baseball games, while only wagering on if a batter will get a single or walk. This is the user's historical wager pattern or behavior. Changes in the current and historical data are then compared and any changes are identified, at step 404. For example, the historical behavior data may be plotted and normal distribution or trends maybe calculated. The same may be done with the current data and the two are compared, at step 406. If the current data is more than two deviations outside historical data, then it can be determined that there is a change in behavior. For example, a user's average wager size $50, and the standard deviation of their wagers is $15. A wager over $80 would be indicative of a change in behavior. The average odds of the user's wagers could also be used as a metric in this fashion. For example, if the user's average wager is at +110 odds, with a standard deviation of +20. This would be consistent with a user that does not take big risks, nor bet on heavy favorites, so if they were to start placing wagers at +250 odds, that would be indicative of a change of behavior. In other embodiments the time in game, or user account balance, or previous wagers, could be considered for user behavior mapping. Embodiments could employ regression analysis on the user's wager size relative to the inning the wager is placed during in a baseball game. In such an embodiment a user may have escalating average wager size as a game goes on, such as $10 average wager in the first inning, $20 in the third inning and $30 from the sixth inning on. This type of pattern would need to have a coefficient of determination, denoted $R^2$, above a threshold set by a system administrators to be considered a behavior pattern. $R^2$ is a statistical measure of how close the data points are to a fitted regression line. The closer $R^2$ values are to 1, the closer the data points are the fitted regression line. For example, if that trendline of the user's wagers against the inning of the wager has an $R^2$ of 0.15, the inning is not correlated to the wager size. Whereas if the user's average wager size has an $R^2$ over 0.90, their wager size is highly correlated to the inning in which the wager is placed. There are also methods of behavior pattern matching that can be used as well and are well known. For example, a user who normally has a history of only wagering on baseball games, and primarily on if a batter will get a single or walk and only wagers an amount between $3 and $5. This data could be plotted, and a normal distribution of the user's pattern calculated. When the user begins to wager on other events or changes the amounts that are wagered, these new wagers will not fall within a normal curve of activity. Now, on occasion, a user may change habits and make an outlying wager. But one outlying wager outside normal patterns will not trigger a change in user behavior as the system would be looking at larger patterns and one event would not account for enough deviation from the norm. As previously discussed, once a change in user behavior is identified, it is then determined how much. Continuing the current example, it would determine if the behavior is more than 2 deviations outside normal historical behavior. If a change is not more than 2 deviations the system returns to step 400 and continues to poll for current user behavior data 400. If a change greater than 2 deviations from historical patterns is identified, the user behavior module 118 then initiates, at step 408, the threshold module 120. For example, if a user starts wagering on homeruns in a baseball game rather than the historical normal pattern of wagering on singles and walks. Furthermore, the user behavior module 118 also initiates, at step 410 the cheating module 122. The user behavior module 118 then waits for the cheating module 122 to determine, at step 412 if the user is cheating. If there is not cheating detected the user behavior module 118 returns to poll for current user's behavior data 400. Alternatively, the user behavior module 118 may not wait for the cheating module 122 to determine if the user is cheating or not, but rather after a predetermined length of time reset and begin polling for the current user's behavior data 400. If cheating is detected the user behavior module 118 will automatically freeze or deactivate the user's account at step 414. The user behavior module 118 will end, at step 416 once the user's account is frozen or deactivated.

FIG. 5 illustrates the threshold module 120. The threshold module is initiated, at step 500, by the user behavior module 118 when a change in a user's behavior is detected and the threshold module 120 receives from the user behavior module 118 data associated with the user's change in behavior. For example, the change in user behavior maybe the fact the user is now wagering on homeruns in a baseball game rather than the user's normal behavior of singles or walks. The odds database 116 is then polled, at step 502 for data similar to the data received from the user behavior module 118. For example, if the user typically only bets on event "a" but has changed behavior to betting on event "b", the change in the user's behavior is betting on event "b". The threshold module 120 would then look for relevant data to event "b" in the odds database 116. Typically, if a user typically wagers on singles in a baseball game but then start wagering on homerun, the winning threshold would then be extracted from the odds database 116. The threshold module 120 then extract, at step 504 from the odds database 116 the winning threshold for the new event the user is now betting on that aligns with the user's change in betting behavior. The winning threshold is a threshold often used to prevent a user from winning too much. It is often set at a level at which a user could only obtain by possibly cheat. Once the winning threshold is extracted, a new threshold is calculated at step 506. The purpose for calculating a new threshold is to lower the normal threshold when a user's behavior changes. The general idea is that if a user's behavior changes it may be due to cheating. Not changing the threshold would allow the user to still win a significant amount because the threshold is still high. Furthermore, a user changing habits most likely would not win as much as they are betting on new events, they are not familiar yet. Reducing the threshold would help identify and shut down cheating sooner. The new winning threshold could be calculated by reducing it by a certain percentage or using other forms of calculations. For example, reducing the threshold by 50%. One reason for reducing the winning threshold by a percentage would be due to the fact that winning thresholds will be different for different events depending on their odds. An event with much higher odds and more unlikely to win would have a lower threshold. For example, if the change in a user's behavior is that they are now wagering on homerun and the typical winning threshold for homeruns is 4, then the threshold module 120 would calculate the new homerun winning threshold as 2 reducing the original threshold by 50%. The new calculated winning threshold is then sent, at step 508 to the cheating module 122. Once the new winning threshold is calculated and sent to the cheating module 122 the threshold module 120 ends at step 510.

FIG. 6 illustrates the cheating module 122. The cheating module 122 begins by receiving, at step 600 from the threshold module 120, the new calculated threshold for the user's change in behavior. The cheating module 122 then polls, at step 602 for the user current activity directly from the user database 110 or could get it directly from the user behavior module 118. For example, the user data the cheating module 122 would poll for is the wager amounts, how much total the user has won or lost and the number of times a user has won or lost. The number of wins by the user since their change in behavior is then calculated at step 604. This can be done by counting or summing the number of times the user had won. In some instances, the user total winnings may need to be calculated rather than the number of times they win depending on how the winnings threshold is determined. In one embodiment the winning threshold may be the number of times a user wins while in another embodiment the winning threshold depends on the total amount of money won by the use. It is also possible that the winning threshold could be a combination of both the number of wins and the total amount of money won. If the user has not reached the new winning threshold the cheating module 122 determines, at step 606 if the user's behavior has changed or the live event has ended. If the user has not reached the new winning threshold and their behavior had not changed the cheating module returns to step 602 to continue to monitor the user's winning at step 604. If the user's behavior has changed, or the live event 102 had ended then they module ends, at step 612. For example, if a baseball games ends in which a user's habits change then the module would end as the user's activity for that event has ended or if a user's behavior goes back to their original pattern or only wagering on singles and walks rather than homeruns. If, in step 606, the user has reached the new winning threshold, a message is sent to the user behavior module 118 at step 610. This message will let the user behavior module 118 that the user is possibly cheating, and it will halt any more bets from the user and freeze their account. The cheating module 122 ends if the user reaches the new winning threshold or if it is determined that the user's behavior changed or the live event 102 ended.

The foregoing description and accompanying figures illustrate the principles, preferred embodiments and modes of operation of those embodiments. However, the embodiments should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

The invention claimed is:

1. A method comprising:

storing a historical wager history for a plurality of users in a user database, wherein each user is associated with an existing winnings threshold;

comparing, for each user, current wager activity of the user with the historical wager activity of the user in the user database;

identifying, for each user, possible cheating, after the comparison exceeds the existing winnings threshold;

calculating a new winnings threshold based on the existing winnings threshold when the possible cheating is identified;

determining that the user is cheating after the comparison exceeds the new winnings threshold; and executing a response when the comparison exceeds the new winnings threshold.

2. The method of claim 1, further comprising:

determining a deviation value for wagers based on the wager patterns of the user.

3. The method of claim 2, wherein the deviation value is at least two.

4. The method of claim 2, wherein the response is executed following a determination that the user has exhibited current wager activity which is at least two deviations removed from the historical wager history of the user.

5. The method of claim 2, further comprising:

determining a change in user wagering behavior after one or more wagers are outside of the predetermined deviation value.

6. The method of claim 1, wherein the change in wager patterns is based on amounts wagered by the user.

7. The method of claim 1, wherein the change in wager patterns is based on types of wagers made by the user.

8. The method of claim 1, wherein current wager activity of the user is determined by at least one of a predetermined time frame and wager activity of the user during a current live event.

9. The method of claim 1, wherein the response comprises halting user betting when the user reaches the new winnings threshold.

10. The method of claim 1, wherein the response comprises freezing an account of the user after halting user betting.

11. The method of claim 1, wherein monetary earnings of the user are compared against the existing winnings threshold and/or the new winnings threshold.

12. The method of claim 1, wherein a frequency of wagers won by the user is compared against the existing winnings threshold and/or the new winnings threshold.

13. The method of claim 1, wherein the new winnings threshold is further calculated based on odds reflected by wagers comprising the change in wager activity of the user.

14. The method of claim 1, wherein the existing winnings threshold and/or the new winnings threshold are of a magnitude reachable only when the user is cheating.

15. The method of claim 1, wherein the change in wager patterns of the user is based on a time dependent wagering activity of the user over the course of a live event.

16. The method of claim 1, wherein, when the change in wager patterns of the user is detected, the new winnings threshold is calculated as a reduction of the existing winnings threshold.

17. The method of claim 1, wherein the existing winnings threshold and the new winnings thresholds are specific to each type of bet the user may place, and, when the change in wager patterns of the user is detected in conjunction with the user changing from a first bet type to a second bet type, the new winnings threshold of the second bet type is calculated as a reduction of the existing winnings threshold of the second bet type.

* * * * *